(12) United States Patent
De Boer et al.

(10) Patent No.: US 11,130,641 B2
(45) Date of Patent: Sep. 28, 2021

(54) SYSTEM AND METHOD FOR TRANSPORTING ITEMS TO A PACKAGING STATION

(71) Applicant: Neopost Technologies B.V., Bagneux (FR)

(72) Inventors: Fokke De Boer, Drachten (NL); Eelke Visser, Drachten (NL)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 27 days.

(21) Appl. No.: 16/728,744

(22) Filed: Dec. 27, 2019

(65) Prior Publication Data
US 2020/0207550 A1   Jul. 2, 2020

(30) Foreign Application Priority Data
Dec. 31, 2018   (DE) .................... 10 2018 133 711.6

(51) Int. Cl.
  *B65G 47/32*   (2006.01)
  *B65G 37/02*   (2006.01)
  *B65B 5/02*    (2006.01)
  *B65B 11/00*   (2006.01)
(52) U.S. Cl.
  CPC .............. *B65G 47/32* (2013.01); *B65B 5/024* (2013.01); *B65B 11/004* (2013.01); *B65G 37/02* (2013.01); *B65B 2210/04* (2013.01); *B65G 2201/025* (2013.01)
(58) Field of Classification Search
  CPC ........ B65G 47/32; B65G 37/02; B65G 5/024; B65G 11/004

USPC .................................................. 198/443, 448
  See application file for complete search history.

(56) References Cited

U.S. PATENT DOCUMENTS

| | | | | |
|---|---|---|---|---|
| 4,356,908 A | * | 11/1982 | Embro, Jr. .............. | B07C 5/362 198/454 |
| 4,889,224 A | * | 12/1989 | Denker ................ | B65G 47/244 198/382 |
| 5,769,204 A | * | 6/1998 | Okada .................... | B65G 47/31 198/443 |
| 5,918,723 A | * | 7/1999 | Schuitema ........... | B65G 47/684 198/347.4 |

(Continued)

FOREIGN PATENT DOCUMENTS

| DE | 102013215312 B3 | 2/2015 |
|---|---|---|
| JP | H02152815 A | 6/1990 |

(Continued)

OTHER PUBLICATIONS

Extended European Search Report for EP 19219857.0-1017, dated May 8, 2020, 11 pages.

*Primary Examiner* — Douglas A Hess
(74) *Attorney, Agent, or Firm* — Cozen O'Connor (57) ABSTRACT

System for transporting items to a packaging station comprising at least a first, a second and a third conveyor, said first conveyor configured for transporting arrangements of one or more items in a first transport direction to the third conveyor, said second conveyor configured for transporting arrangements of one or more items in a second transport direction to the third conveyor, said third conveyor configured for transporting said arrangements from the first and the second conveyor in a third transport direction, a fourth and a fifth transport direction towards a packaging station.

8 Claims, 8 Drawing Sheets

(56) References Cited

U.S. PATENT DOCUMENTS

| | | | |
|---|---|---|---|
| 6,513,641 B1 * | 2/2003 | Affaticati | B07C 5/36 |
| | | | 198/357 |
| 6,601,689 B2 * | 8/2003 | Go | B23P 21/004 |
| | | | 198/414 |
| 6,622,847 B2 * | 9/2003 | Schuitema | B65G 47/5145 |
| | | | 198/370.09 |
| 7,137,502 B2 | 11/2006 | Carey et al. | |
| 7,909,155 B2 * | 3/2011 | Lupton | B65G 43/08 |
| | | | 198/357 |
| 8,061,506 B2 * | 11/2011 | Schafer | B65G 43/08 |
| | | | 198/444 |
| 8,322,515 B2 * | 12/2012 | Rausch | B65G 47/088 |
| | | | 198/445 |
| 9,315,339 B2 * | 4/2016 | Gaillard | B65G 47/30 |
| 9,624,043 B2 * | 4/2017 | Koetje | B07C 5/16 |
| 9,694,926 B2 * | 7/2017 | Overley | B65B 25/146 |
| 9,751,693 B1 * | 9/2017 | Battles | B25J 9/0093 |
| 9,771,222 B2 * | 9/2017 | Schroader | G06K 9/00771 |
| 2016/0107782 A1 | 4/2016 | Hutter et al. | |
| 2019/0225432 A1 | 7/2019 | Grant et al. | |

FOREIGN PATENT DOCUMENTS

| | | |
|---|---|---|
| JP | 2006188300 A | 7/2006 |
| WO | 9967159 A1 | 12/1999 |
| WO | 2014117817 A1 | 8/2014 |
| WO | 2015060882 A2 | 4/2015 |
| WO | 2016059218 A1 | 4/2016 |
| WO | 2019081773 A1 | 5/2019 |

* cited by examiner

SYSTEM AND METHOD FOR TRANSPORTING ITEMS TO A PACKAGING STATION

TECHNICAL FIELD

The invention relates to a system and a method for transporting items varying in size and number to a packaging station for being automatically packaged. The invention also relates to a system and a method for automatically packaging items varying in size and number in custom-sized cardboard boxes.

TECHNICAL BACKGROUND

Mail ordering has become a widely used way of buying goods. More and more companies offer virtual department stores, in which the customers can electronically put goods in a shopping cart that later will be transferred by the respective company into a dispatch order so that in a warehouse a shipment comprising the items ordered (and sometimes additional items such as samples, vouchers, invoices, void-fill etc.) can be assembled based on the respective dispatch order.

While assembling a shipment in a warehouse of a specialized distributor is nowadays often done more or less fully automated, packaging the items to be shipped is still a challenge, in particular when a shipment comprises several items of different sizes and in different quantities. Often, the items to be packaged are provided automatically to a person packaging the items manually. Depending on the size and number of the items, the person selects a suitable box size. Generally the box is a cardboard box that upon packaging is folded from a corresponding cardboard blank.

To automate the packaging process even in cases where the items vary in size and number, a system has been proposed in WO 2014/117817 A1 that allows—within the boundaries imposed by the material used—creating a fully custom-sized box, i.e. a cuboid box, of which width, length and height are adapted to the respective content of the box. The box is created from a roll or a stack of cardboard by cutting out and creasing a custom-sized blank from which the box including panels to form a lid is folded at a packaging station automatically around the item(s) to be packaged after placing the item(s) on the blank.

WO 2016/059218 A1 discloses a system and a method for automatically packaging items varying in size and number employing two separate packings, namely an inner packing surrounding the items to be packaged in a first direction, and an outer packing surrounding the inner packing in a second direction, said second direction being substantially perpendicular to the first direction such that the inner and the outer packing form a combined package enclosing the package items from all sides.

While the known systems and methods for automating the packaging process work well for a number of applications, and in particular the system disclosed in WO 2014/117817 A1 has proven to allow packaging items varying in size and number fully automatically, it has turned out that there is still a need for optimization of the packaging process. While using a special box design as disclosed in WO 2019/081773 A1 allows to package about 1.000 and even more sets of items varying in size and number per hour, it has turned out that an important factor limiting the throughput of a respective packaging system is the feeding of one or more items to be packaged to the respective packaging station.

Conventionally, the items to be packaged are manually or automatically picked from a storage and brought to an arranging station, where they are manually or automatically arranged, i.e. positioned with respect to a later created box (and with respect to each other, if more than one item is to be packaged in the same box), in a configuration (herein after called "arrangement") that is considered suitable or even optimal with respect to different optimization criteria (such as volume of the box to be created). In arranging the items, different boundary conditions have to be observed, such as for example maximum width of the box to be created, as the boxes are typically created from cardboard having a certain width fed to a system for cutting, creasing and folding the cardboard around the arrangement of one or more items to be packaged.

Arranging the items and observing the boundary conditions is time consuming and obviously takes the longer the more items have to be arranged. Arranging is typically done on a conveyor, typically a conveyor belt, which then transports the arrangement to the packaging station. If it takes longer to prepare an arrangement than it takes to package a previously prepared arrangement, the packaging process slows down as the packaging station has to wait for the next arrangement. Time lost in arranging the items can typically not be made up by increasing the speed of the conveyor transporting the respective arrangement from the arranging station to the packaging station, as the items may tumble and even fall down from the conveyor, in particular if the items do not have a cuboid or other shape that could provide a stable, not easy to tilt basis, or have such shape but are placed such that their centre of mass can easily be brought out of the support area, such as is the case for typical bottles or parts encased in complex shaped blister packages. It is therefore common to ensure that an arrangement of one or more items upon transporting it from the arranging station to the packaging station is not subjected to accelerations above 1 m/s$^2$.

Using different conveyers for transporting items or arrangements of items in separate flows is well known in the art, for example from WO 2015/060885 A2, US 2019/0225432 A1, U.S. Pat. No. 7,137,502 B2 or WO 99/67159. However, these documents teach branching a flow of items into different flows. In contrast, US 2016/0107782 A1 teaches merging a flow of items transported on a first conveyor with a flow of boxes transported on a second conveyor by pushing first the boxes from the second conveyor onto a third conveyor and then placing the items from the first conveyor in the boxes placed on the third conveyor.

SUMMARY

Having regard to the aforementioned situation, it is an object of the invention to provide a system and a method for transporting items to a packaging station for being automatically packaged that allows to significantly increase the throughput of a packaging station by increasing the number of arrangements of one or more items that can be fed to the packaging station in a certain time period while avoiding the danger that due to high accelerations the items tumble and fall down or at least leave their designated position in an arrangement of multiple items.

The object is achieved by a system according to claim 1 and a method according to claim 7. Independent claim 12 relates to a system for automatically packaging items in custom-sized cardboard boxes. Independent claim 13 relates to a method for automatically packaging items in custom-sized cardboard boxes. Advantageous embodiments and implementations are subject of the respective dependent claims.

The invention allows to prepare two or even more arrangements of one or more items for being automatically packaged in parallel, thus increasing the potential number of arrangements that could be prepared in a certain time period and which are then fed to a packaging station while allowing to keep the acceleration that the items undergo when they are transported from the position, where they are arranged, to the position, where they are packaged, low. In order to achieve this, a system according to the invention comprises at least a first, a second and a third conveyor, said first conveyor configured for transporting arrangements of one or more items forming a first flow of arrangements in a first transport direction onto the third conveyor, said second conveyor configured for transporting arrangements of one or more items forming a second flow of arrangements in a second transport direction onto the third conveyor, which merges the two flows into one flow that can then be transported to a single packaging station. Hence, the third conveyor can be called a merge conveyer.

As will become apparent from the following description, the merge conveyer does not only merge the flows of arrangements, but also aligns or at least pre-aligns the arrangements so that they can easily be packed at the packaging station. In order to achieve this, the said third (or merge) conveyor is configured for transporting said arrangements from the first and the second conveyor in a third, a fourth and a fifth transport direction towards a packaging station, wherein said first, second and third transport directions are substantially parallel to each other and said fourth and fifth transport directions are opposite to each other and substantially orthogonal to said first, second and third transport directions. As will also become apparent from the following description, the transportation paths along which the arrangements are transported during their handling do not have to be straight, but can rather be curved paths. However, at the transfer points where the arrangements are transferred form the first or second conveyer onto the third conveyer, the arrangements move in certain straight transport directions.

Further characteristics, features and advantages of the invention will become apparent from the following description in conjunction with the drawing, which comprises 16 figures.

DESCRIPTION OF PREFERRED EMBODIMENTS

FIGS. 1 to 15 show preferred embodiments schematically in a top view, i.e., seen from above towards a respective system comprising different conveyors as will be explained in detail below.

Figure 1:
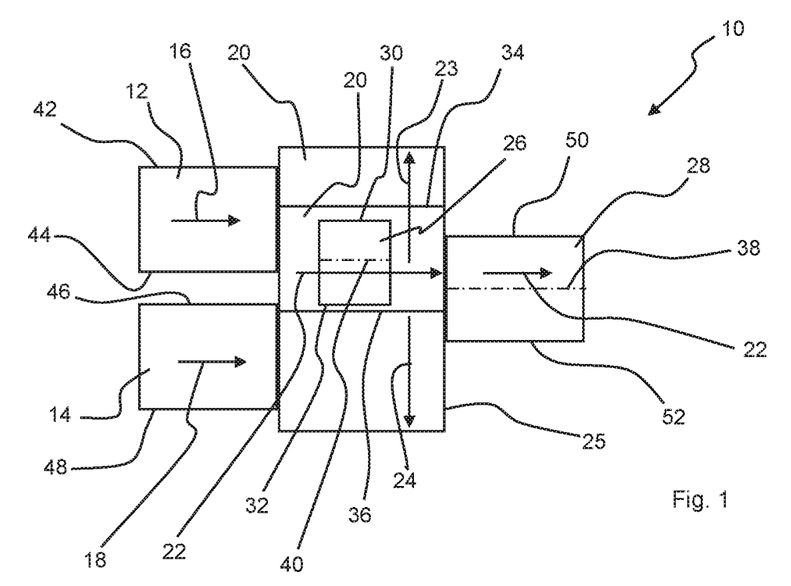
FIG. 1 shows very schematically the general layout of conveyors according to a first embodiment of the invention.
Figure 2:
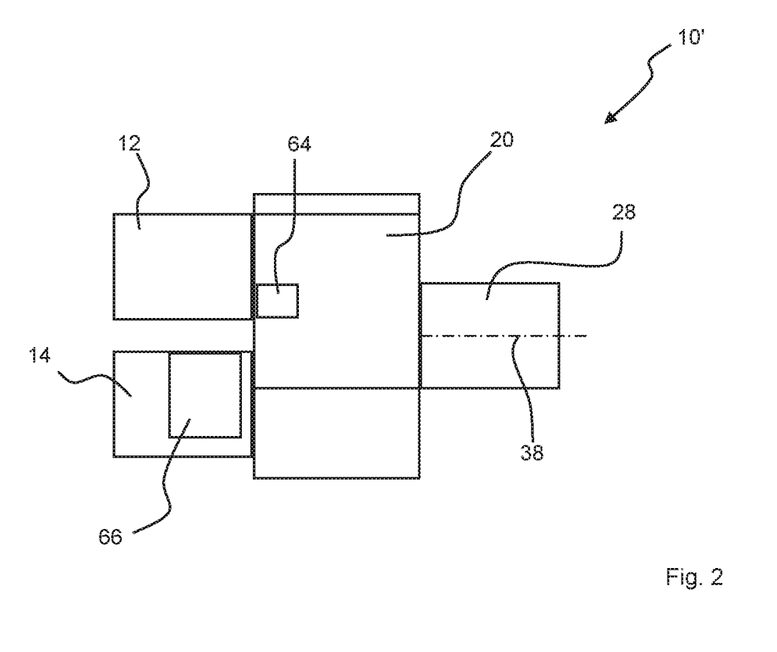
FIG. 2 shows very schematically the general layout of conveyors according to a second embodiment of the invention.

FIG. 1 shows very schematically the general layout of a system 10 for transporting arrangements of one or more items from—in this embodiment two—arranging stations (not shown) towards a packaging station (also not shown). At each arranging station, items are arranged manually or automatically for example by using robotic placement stations and or automatic feed mechanism. Each arranging station is positioned upstream of and associated with a first conveyor 12 and a second conveyor 14, respectively, which are preferably conveyor belts and are configured to transport the respective item or items arranged directly on them or loaded onto them in a first transport direction 16 and a second transport direction 18, respectively, towards a third conveyor 20, which comprises preferably also a conveyor belt and which is configured to transport the items transported onto it from the first or the second conveyor 12, 14 respectively, in a third transport direction 22 while being itself moveable in a fourth transport direction 23 and a fifth transport direction 24. To this purpose, a conveyor belt may be arranged on rails, rollers, or similar guiding and positioning structure schematically indicated by 25 allowing the movement of the complete conveyor belt in said fourth and fifth directions. The third conveyor 20 thus allows merging the flows of arrangements of one or more items from the first and the second conveyors 12, 14 and is thus also called a merge conveyor.

In this embodiment, an arrangement of items schematically represented by rectangle 26 is transported towards a fourth conveyor 28 which may also comprise a conveyor belt for transporting items transported onto it by the merge conveyor 20 in the third transport direction 22. With respect to the denominations of the directions, the first, second and third directions all run parallel and could in an x-y-plane be regarded for example as running in x-direction. As the conveyors 12 and 14 are arranged parallel but offset to each other, it has been chosen to use different names (first and second directions) for the respective movement that can be imparted by the conveyors 12 and 14 to an arrangement placed on them. If instead of belts other types of conveyors are used, the paths, along which arrangements are transported by the first and the second conveyor 12, 14 may be curved. However, as the merge conveyer 20 is, in top view, basically rectangular, at least at the point where the arrangements are handed over from the first and second conveyors 12, 14 to the merge conveyor and from the merge conveyor 20 to the fourth conveyor 28 the first, second and third transport directions 12, 14 and 22 are substantially parallel while the fourth and fifth transportation directions 23, 24 are substantially orthogonal thereto and opposite to each other.

Conveyor 20 may move in x- and y-direction, wherein the movement in the x-direction, i.e., the third transport direction 22 parallel to the first and second direction, is mandatory, while a movement in the fourth or fifth direction 23, 24 (the y-direction) is necessary only to bring the respective arrangement on conveyor 20 into a certain transfer position with respect to conveyor 28. As upon handing over the respective arrangement 26 from conveyor 20 onto conveyor 28 both conveyors move in the same direction, it has been decided to denominate this direction with the same name, i.e., the third direction 22. In this conjunction, it should also be noted that upon transferring arrangements from the first or the second conveyor 12 and 14 onto the third conveyor 20 respectively from the third conveyor 20 onto the fourth conveyor 28, the respective conveyors impart movement onto the arrangement in the same direction. In case, as it is preferred, the conveyors are formed by conveyor belts, it means that upon transferring the arrangements the respective conveyor belts run in the same direction at identical speed such that the items of an arrangement are not only pushed onto the next conveyor but are also drawn by it. This also prevents that an arrangement of two or more items is separated due to different speeds of successive conveyors.

The fourth conveyor 28 may already be part of a packaging station where the respective arrangement of one or more items is placed on a custom-sized cardboard blank that has been specifically cut and creased for the respective arrangement of one or more items based on information about the dimensions of the arrangement obtained for example by laser scanners arranged at the end of each of the first conveyor 12 and the second conveyor 14 to scan the maximum outer dimensions of the respective arrangement in order to automatically calculate the minimum inner dimensions a box for the respective arrangement should have. Typically, these scanners are positioned a certain distance upstream to the third conveyor 20 in order to allow ample time to measure dimensions, to calculate movements of the conveyor and dimensions of a box to created and to prepare a corresponding cardboard blank. Likewise, the arranging stations are somewhere upstream of the first and second conveyors and one or several conveyors may be positioned between the arranging stations and the first and second conveyor shown in FIG. 1 to allow queueing the arrangements.

The conveyor 28 may also be an "intermediate" conveyor that leads towards a respective packaging station. As known packaging stations, such as for example the one disclosed in WO 2014/117817 A1, allow creating custom-sized boxes or packages very quickly, it has turned out that the limiting factor in the maximum throughput of a respective packaging system is the number of arrangements of items provided to the packaging station in a certain time period. For example, if boxes such as the ones disclosed in WO 2019/081773 A1 are used, it is easily possible to package 1,000 or more arrangements of items per hour. However, preparing a respective number of arrangements is difficult, in particular if some or all of the arrangements comprise more than one item. Conventionally, arrangements are prepared at only one arranging station and are then transported by one or more respective conveyors to a packaging station, where the respective arrangement is placed on a cardboard blank that has been custom-sized for the respective arrangement and which comprises different so called panels that are folded around the arrangement.

The described systems now allow that items are arranged in parallel at two or even more respective arranging stations and are then transported by, in the shown embodiment, a first and a second conveyor towards a single packaging station. Conventional production lines comprise a single conveyor belt, onto which items are put from different production or processing stations, which requires sufficiently long production halls and which typically involves the problem that it is not possible to put an arrangement of several items onto a moving conveyor belt without "destroying" the arrangement in the sense that the items are no longer positioned with respect to each other and the conveyor in the wanted position, as typically in doing so the arrangement undergoes abrupt direction changes and accelerations in two orthogonal directions, namely the direction, in which it is put on the conveyor belt and the moving direction of the conveyor belt. According to various aspects described herein, as the third conveyor can be moved simultaneously in two directions, the total acceleration of the arrangement can be kept low. As mentioned before, it is important not to accelerate the arrangement too quickly as otherwise items may tumble and the respective arrangement may no longer fit into the box to be created. Experiments have shown that the acceleration imparted by the respective conveyors to the arrangements should not increase 1 m/s$^2$.

Figure 7:
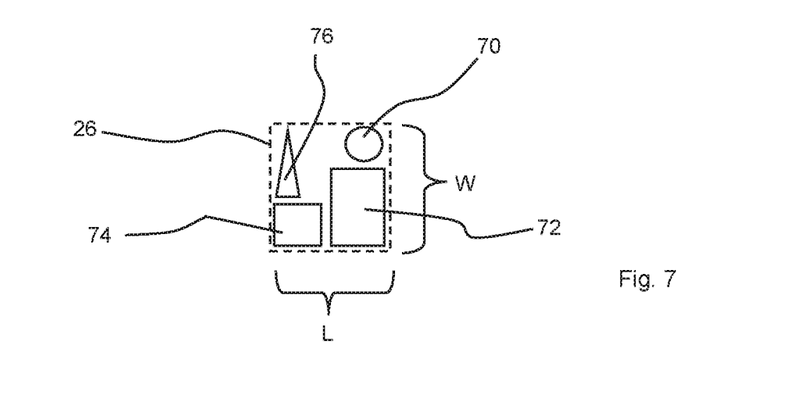
FIG. 7 is an enlarged schematic view of an arrangement of items.

As is apparent from the disclosure herein, items may be arranged in parallel at two respective arranging stations, and the respective arrangements are then transported via the conveyors towards a packaging station. In the situation shown in FIG. 1, an arrangement 26 of items (which may be a single item, but which typically will be an arrangement of several items having different shapes and dimensions as schematically indicated in FIG. 7. In FIG. 7, four items 70, 72, 74 and 76 are arranged for being packaged together. This arrangement forms an arrangement 26 in the sense of the invention, and the outer dimensions in the first, second and third transport direction determines the so-called length L of the arrangement, while the dimension in the fourth and fifth transport direction determines the so-called width W of the arrangement 26. As the items are not yet in a box, in the enlarged view of FIG. 7 the arrangement is indicated by a dashed line. The dimensions L and W of this arrangement determine the minimum inner dimensions a respective box for packaging the arrangement needs to have.

Returning now to FIG. 1, such arrangement 26 has been transported onto conveyor 20 either by conveyor 12 or by conveyor 14. Conveyor 20 functions as a merge conveyor in the sense that it merges—seen from the perspective of the respective arrangements transported by the conveyors—two streams (or flows) of arrangements from the first and the second conveyor 12 and 14 into a single stream (or flow) of arrangements. In the embodiment shown in FIG. 1, the conveyor 12 also functions as an align conveyor in the sense that it can align the arrangements with respect to a box to be created for the respective arrangement. In this sense, "alignment" means that the arrangement 26 is positioned such that its outer edges 30 and 32, which determine the width of the arrangement, are aligned with respective inner edges of a box to be created so that the so-called side panels of the box can be erected without being hindered by the arrangement. Hence, a merge conveyor per se can do both, merging and aligning, while in certain cases, as will be described later, it can be advantageous to employ one or more separate align conveyors that do not merge different flows of arrangement but only align an arrangement. In such case, the merge conveyor may pre-align the arrangements, i.e., bring them closer to the desired alignment while not fully into it.

For the purpose of taking over the arrangement 26 from either one of the conveyors 12 and 14, conveyor 20 is positioned by transversal movement, i.e., movement in the fourth or fifth direction 23, 24 such that its edges 34 and 36 allow a transfer of the respective arrangement on conveyor 12 respectively 14 onto conveyor 20. To ensure this, both conveyors 12 and 14 may advantageously be provided with laser scanners or other type of position and/or 3D scanner allowing to determine the width W of a respective arrangement transported by the conveyors 12 and 14 and to determine its position on those conveyor belts. However, if, as mentioned before, laser scanners or the like are used to determine information for making a box for the arrangement, a control unit controlling the system can use this information also for calculating the movements of the different conveyors.

Once the arrangement 26 has been completely transported onto conveyor 20, conveyor 20 may as necessary move in the fourth or fifth direction 23, 24 in order to transport and align the arrangement with respect to conveyor 28. At the same time, it also transports the arrangement in the third transport direction 22 such that when the arrangement 26 reaches the conveyor 28 it is in a specified transfer position. In the shown embodiment, this transfer position is already a position, in which the arrangement 26 is aligned with respect to a blank for packaging the arrangement. Typically, the system and its components will be set up to be symmetrical with respect to a center line indicated by the dash-dotted line 38 of conveyor 28 such that when the respective center line 40 of the arrangement 26 is aligned with the center line 36, the arrangement 26 would upon transporting it onto a respective blank also be centered between the respective panels forming the sides of a box for the arrangement.

As is also apparent for an expert in the art from the disclosure herein, in case it turns out that it takes longer to prepare a specific arrangement of items for example at the arranging station associated with conveyor 12, it is possible to transport two or more arrangements one after each other from an arranging station associated with conveyor 14.

In the shown embodiment, the conveyors 12, 14, 20 and 28 basically have the same width, i.e., the same dimensions between their respective edges 34 and 36, 42 and 44, 46 and 48, and 50 and 52. If, as will usually be the case, the conveyors are formed by conveyor belts, this allows to use standardized components for the conveyors and hence to decrease cost of manufacture and maintenance. However, typically there will be a certain minimum distance between conveyors 12 and 14 and arrangements like the arrangement 26 may have a width extending beyond half of the width of conveyors 12 and 14 so that even in case an arrangement is positioned close to the adjacent edges 44 and 46 of conveyors 12 and 14, it would not be possible to transport an arrangement of items onto conveyor 20 from one of the conveyors 12 and 14 when conveyor 20 is in a position for transferring the arrangement currently transported by it onto conveyor 28. Thus, in the shown embodiment once the arrangement 26 has been transported onto conveyor 28, conveyor 20 would have to move in the fourth direction 23 respectively fifth direction 24 in order to be able to accept a new arrangement from conveyor 12 or conveyor 14. In order to even further increase the throughput of a packaging system fed with arrangements of one or more, in a preferred embodiment 10' shown in FIGS. 2 to 6, the width of the merge conveyor 20 is increased with respect to the width of the conveyors 12, 14 and 28.

In the embodiment 10' shown in FIGS. 2 to 6, the width 54 of conveyor 20, i.e., the distance between its edges 34 and 36 is chosen such that it corresponds to the distance 55 between the edge 52 of conveyor 28, which is the edge distant to conveyor 12, and a virtual straight line 56 (FIG. 6) extending the edge 42 of conveyor 12, which is the edge distant to conveyor 28. In the shown embodiment, as the widths 58 and 60 of the conveyors 12 and 14 are identical, the width 54 of the conveyor 20 corresponds also to the distance 61 of a virtual straight line 62 extending the edge 48 of conveyor 14, which is the edge distant to conveyor 28, and the edge 50 of conveyor 28, which is the edge distant to conveyor 14. If the conveyors 12 and 14 are different, the width of conveyor 20 should be chosen such that it at least corresponds to whatever distance between edge 42 and edge 52 respectively edge 48 and edge 50 is bigger. As will become apparent from the following description, this will in many cases ensure that a next arrangement can be transported onto the conveyor 20 without repositioning conveyor 20 first as there is always an "overlap" between conveyor 20 and both conveyors 12 and 14.

Figure 3:
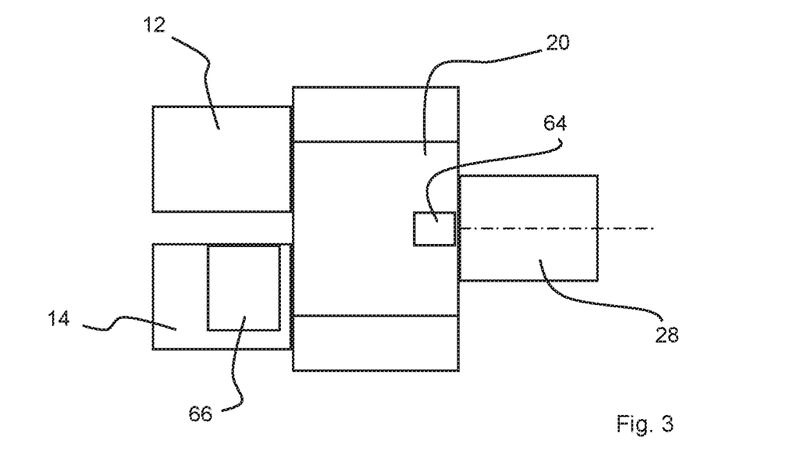
FIGS. 3 to 5 show schematically the embodiment according to FIG. 2 during different stages of a transport process of transporting two different arrangements of items towards a packaging station.

However, if an arrangement is very wide, it may still be necessary to slightly move conveyor 20 towards the respective conveyor 12 or 14. In the situation shown in FIG. 2, a first arrangement of items 64 has been transferred onto conveyor 20 from conveyor 12. While transporting the arrangement 64 towards conveyor 28, conveyor 20 is also moved in the fourth direction towards conveyor 14, such that the respective arrangement 64 is brought to a predetermined transfer position with respect to conveyor 28. In FIG. 3, arrangement 64 is in the transfer position and can now be moved in the third direction onto conveyor 28.

Figure 4:
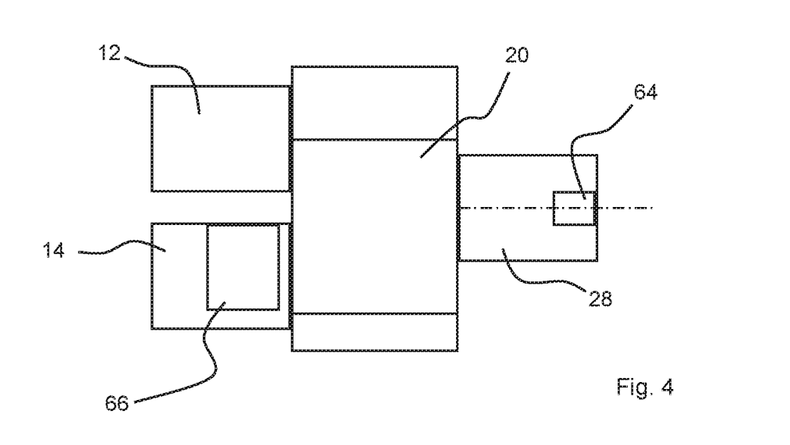

In the situation shown in FIG. 4, conveyor 20 has been moved further towards conveyor 14 while arrangement 64 has been moved towards a packaging station (not shown) downstream of conveyor 20.

Figure 5:
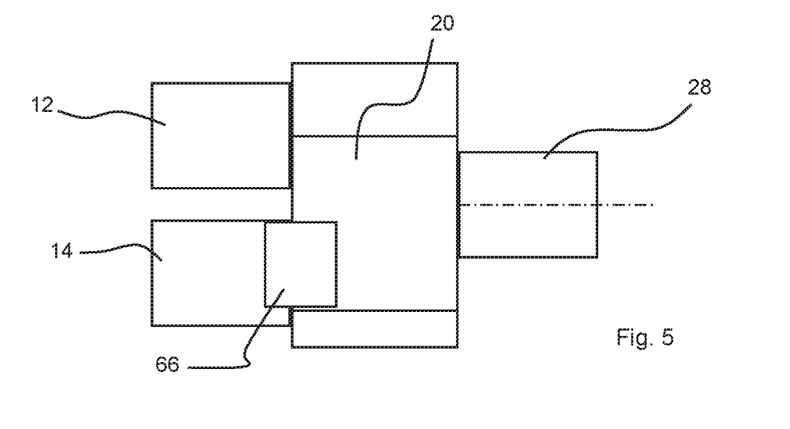
Figure 6:
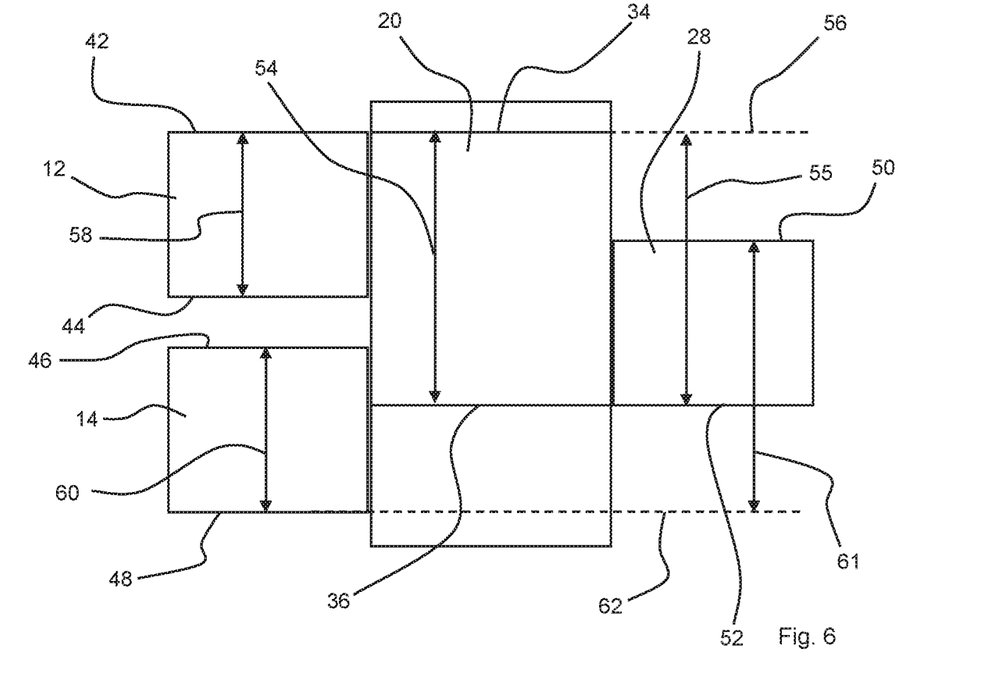
FIG. 6 is an enlarged schematic view of the embodiment according to FIG. 2 for clarifying certain definitions and dimensions used herein.

In the situation shown in FIG. 5, arrangement 66 is being transferred from conveyor 14 onto conveyor 20, while the arrangement 64 has already been packaged (or is being transported further to a packaging station) so that it is not shown in FIG. 5.

FIGS. 8 to 13 show another preferred embodiment 10" of the invention comprising again certain conveyors that have already been described in conjunction with FIGS. 2 to 6, in particular a third conveyor 20 dimensioned as the conveyor 20 of FIGS. 2 to 6 so that the same reference numbers are used. However, in this embodiment a fifth conveyor 80 and a sixth conveyor 82 are provided. Similar to conveyor 20, the fifth conveyor 80 is configured for transporting arrangements of one or more items in, if necessary, more than one transport direction, namely a sixth direction 84, a seventh direction 86 and an eight direction 88. In this embodiment, the sixth direction 84 is parallel to the third direction, and the seventh and eighth directions 86, 88 are parallel to the fourth and fifth directions. However, conveyor 28, or other conveyors that may be provided between conveyor 28 and conveyor 80, may have a curved transportation path, so that the transport directions of conveyor 80 would no longer be parallel to the corresponding ones of conveyor 28. While conveyer 80 does not merge two different flows, it can function as an align conveyor if necessary, i.e., in cases, where the respective arrangement has not already been fully aligned by the conveyor 20 with respect to the box to be created. Thus, conveyer 80 is also designated as align conveyer. This particular embodiment allows increasing the throughput of a packaging system further, as the number of arrangements that can be transported and aligned per time unit can be substantially increased as will be explained now.

Depending on the width W1 and W2 of arrangements 64 and 66 exemplarily conveyed by the conveyors shown in FIGS. 8 to 13, it may be that in an optimal transfer position for arrangement 64 from conveyor 20 to conveyor 28, i.e., a position, in which the arrangement 64 would already be aligned with respect to a later created box, it would not be possible to transfer the next arrangement 66 onto conveyor 20. To facilitate understanding the situation, the dashed-dotted line 90 indicates the center line of a box to be created and on which—seen in the traveling direction towards the box to be created—the center of the respective arrangement should be placed in case the conveyors are set up as shown.

Figure 8:
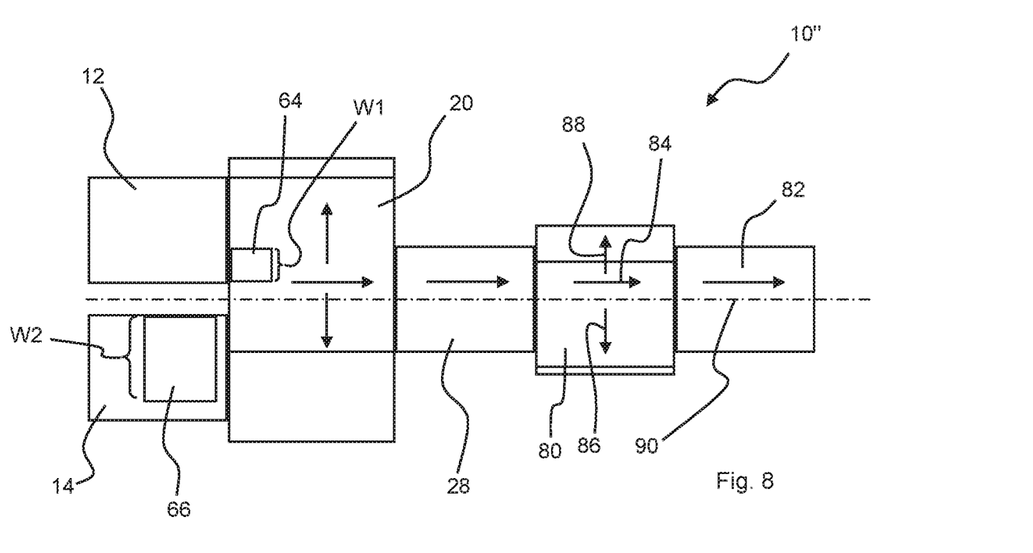
FIG. 8 shows very schematically the general layout of conveyors according to a third embodiment of the invention.

In the situation shown in FIG. 8, arrangement 64 has just been transferred by conveyor 12 onto conveyor 20, while arrangement 66 to be packaged afterwards is ready on conveyor 14 for being transferred onto conveyor 20. Would there be no align conveyor 80, conveyor 20 would have to align arrangement 64 with respect to the dash-dotted line 84 and hence would have to stop moving laterally in order to transfer arrangement 64 onto conveyor 28. However, in such a position it would not be possible to transfer arrangement 66 from conveyor 14 onto conveyor 12. This would slow down the complete packaging process as conveyor 20 would have to wait until the complete arrangement 64 has been transferred onto conveyor 28 before moving further laterally towards conveyor 14 to allow the arrangement 66 to be transferred onto conveyor 20.

Figure 9:
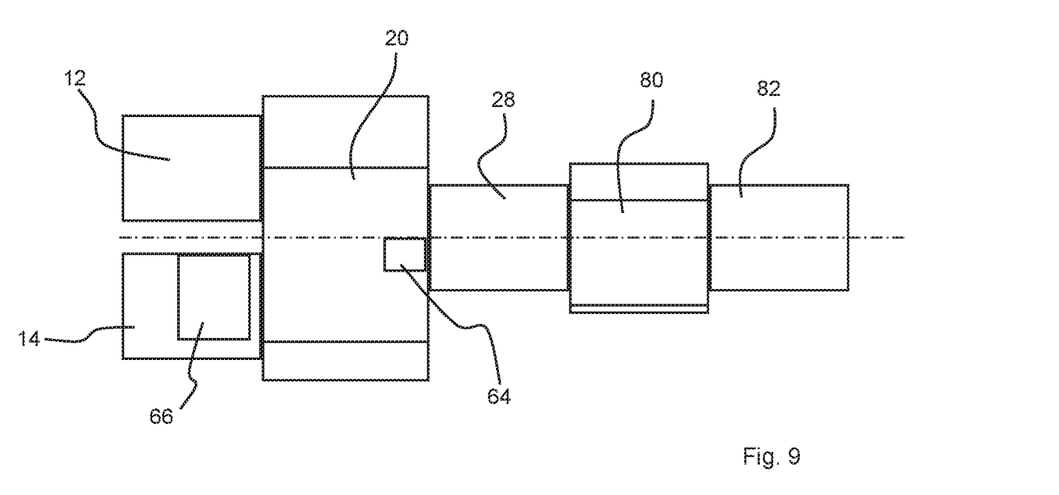
FIGS. 9 to 13 show schematically the embodiment according to FIG. 8 during different stages of a transport process of transporting two different arrangements of items towards a packaging station.

The embodiment 10" allows that arrangement 64 is transported as shown in FIG. 9 past the optimal, i.e., aligned transfer position so that it becomes possible to transfer arrangement 64 from conveyor 20 onto conveyor 28 while at the same time transferring arrangement 66 from conveyor 14 onto conveyor 20. For the reasons explained above (limited acceleration allowed), this facilitates transporting arrangements from the conveyors 12 and 14 towards a packaging station at increased average speed.

Figure 10:
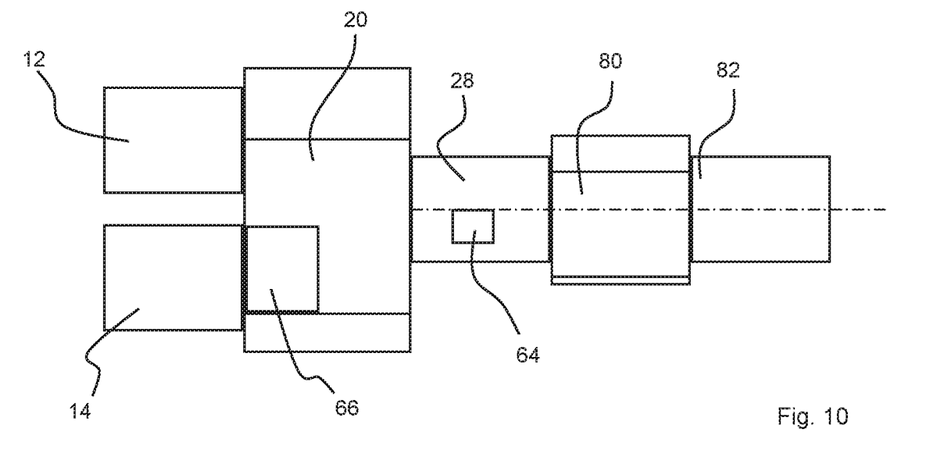

In the situation shown in FIG. 10, arrangement 66 has been completely transferred onto conveyor 20 while the arrangement 64 is being transported by conveyor 28 towards the align conveyor 80.

Figure 11:
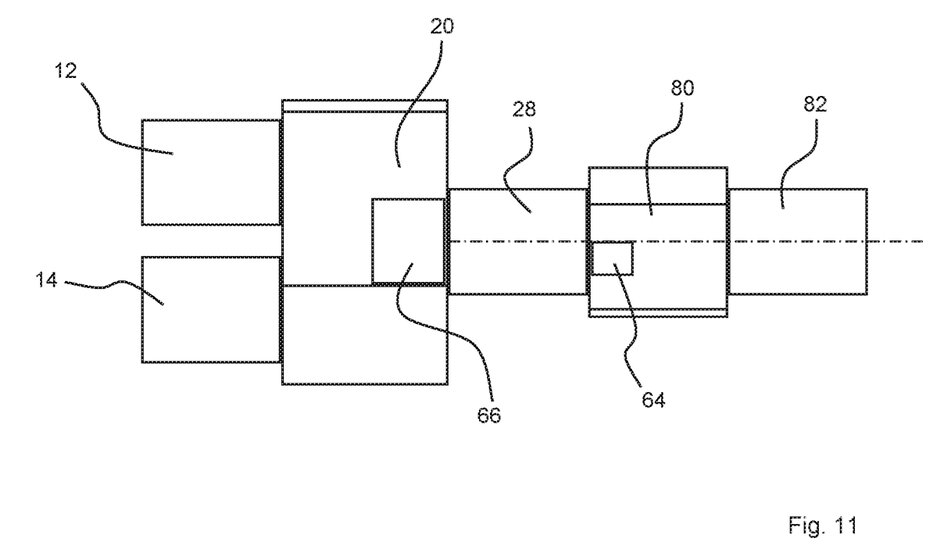

In the situation shown in FIG. 11, align conveyor 80 has received arrangement 64 while conveyor 20 has brought arrangement 66 towards an already optimal, i.e., aligned transfer position for transferring it onto conveyor 28. Due to the dimensions of arrangement 66, conveyor 20 has in this case moved laterally towards conveyor 12 so far that any further arrangement on conveyor 12 could be transferred onto conveyor 20 while unloading arrangement 66 from conveyor 20 onto conveyor 28.

Figure 12:
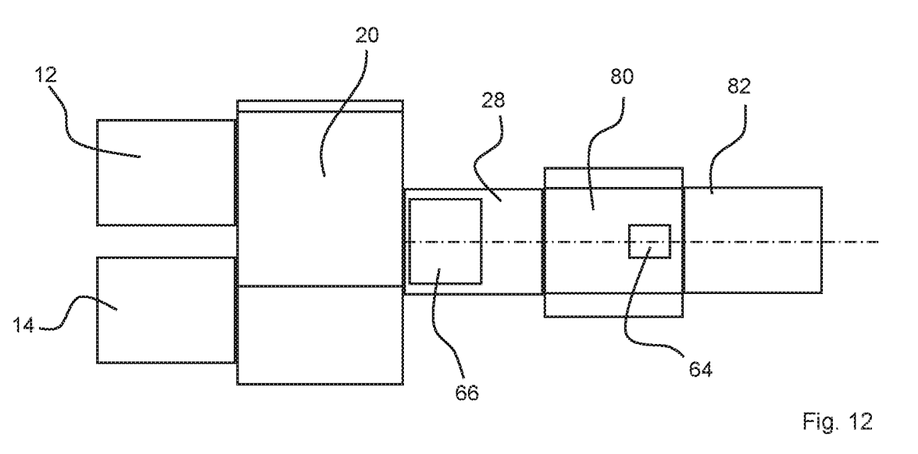

In the situation shown in FIG. 12, align conveyor 80 has moved laterally in the eight direction (88 in FIG. 8) while transporting arrangement 64 also transversally, i.e., in the sixth transport direction (84 in FIG. 8) towards conveyor 82 in order to bring arrangement 64 in an aligned position.

Figure 13:
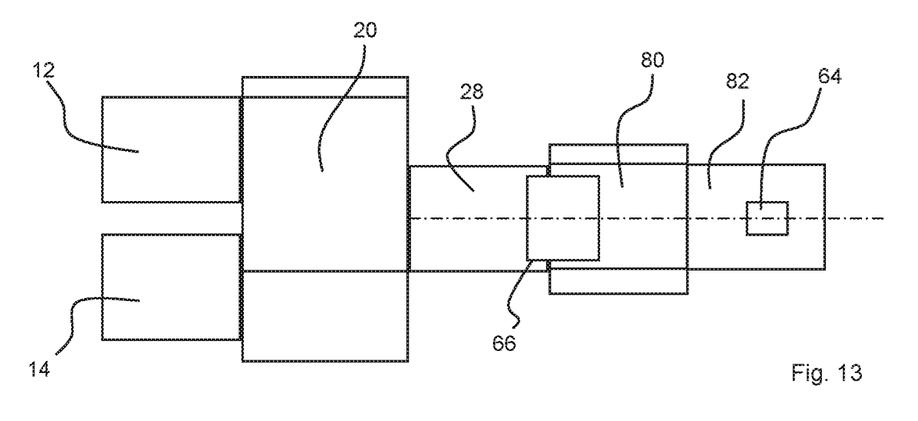

In the situation shown in FIG. 13, arrangement 64 has been transferred onto conveyor 82, while arrangement 66 is currently being transferred from conveyor 28 onto align conveyor 80. In the case shown, arrangement 66 is already in an aligned position so that align conveyor 80 does not have to move laterally.

Figure 14:
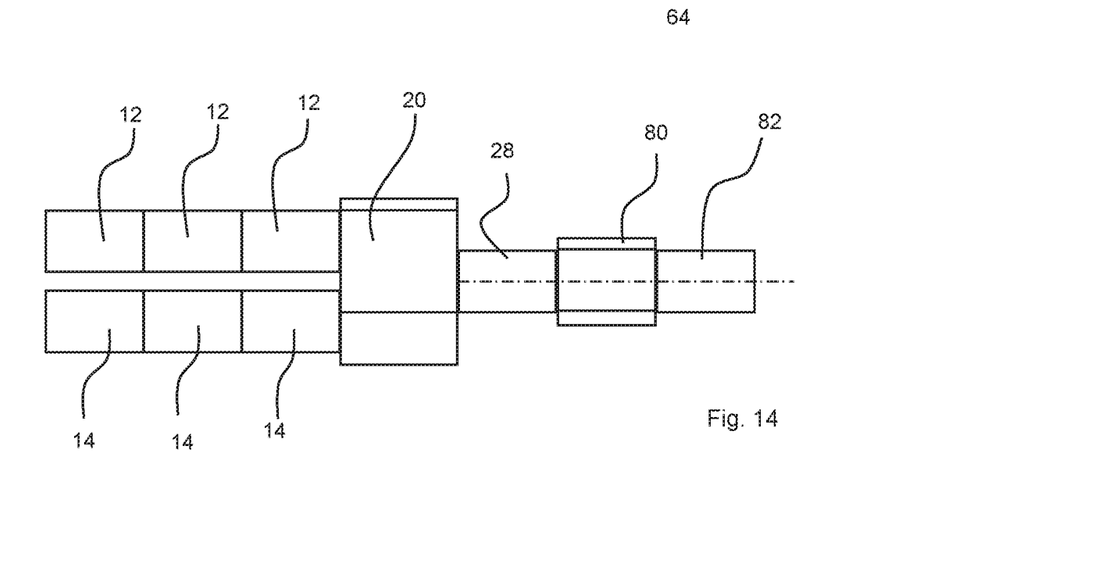
FIG. 14 shows schematically an embodiment with several queueing conveyors between an arranging station and a merge conveyor.

FIG. 14 shows a configuration, in which several first conveyors 12 and several second conveyors 14 are arranged in respective series, which allows that the conveyors function as queueing conveyors between respective arranging stations and the merge conveyor 20.

Figure 15:
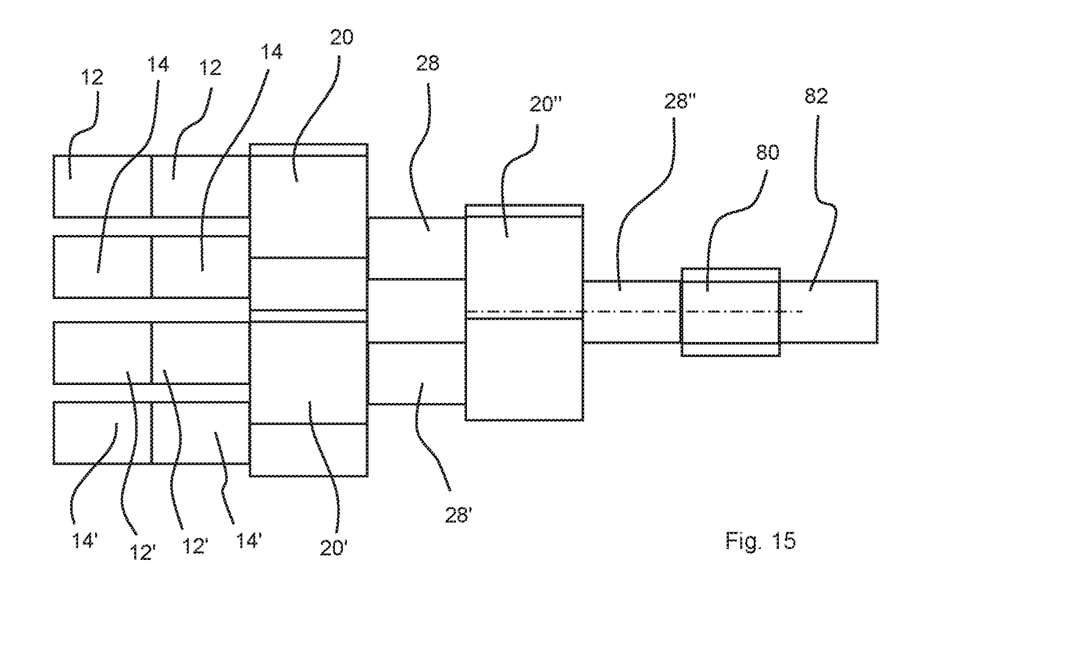
FIG. 15 shows schematically an arrangement with two merge conveyors and one align conveyer in a cascaded configuration.

FIG. 15 shows a configuration in which three merge conveyors 20, 20' and 20" are cascaded. The first merge conveyor 20 is fed by a number of first and second conveyors 12 and 14 and feeds a first so called "fourth conveyor" 28. The second merge conveyor 20' is fed by a number of first and second conveyors 12' and 14' and feeds a second fourth conveyor 28'. The two fourth conveyors 28 and 28' are arranged parallel to each other and feed the third merge conveyor 20", which in turn feeds yet another fourth conveyor 28" feeding a fifth conveyor 80, which is configured for transporting arrangements of one or more items in the sixth, seventh and eighth transport directions as described above and can thus also function as an align conveyor if necessary, i.e., in cases, where the respective arrangement has not already been fully aligned by the conveyor 20" with respect to box to be created. Align conveyor 80 feeds a sixth conveyor 82, which may already lead arrangements on top of a bottom panel of a box for packaging the items or which may hand over the arrangement to a respective packaging station.

Figure 16:
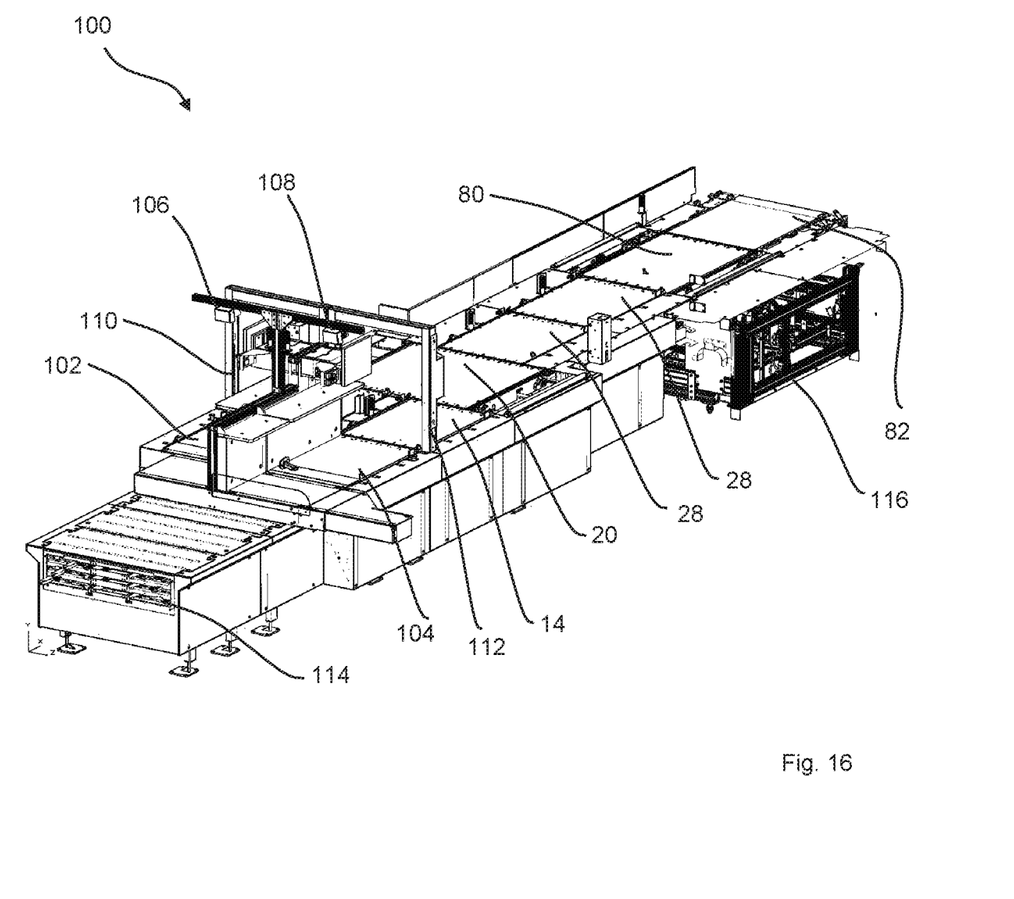
FIG. 16 is a schematic perspective view of system for automatically packaging items according to an embodiment of the invention comprising a merge conveyor.

In FIG. 16, a system 100 for automatically packaging items according to one embodiment of the invention in a configuration with a merge conveyor 20 and an align conveyor 80 is shown. The system comprises parts like a first conveyor (not visible) and second conveyor 14 that have already been described above. System 100 further includes a first arranging station 102 and a second arranging station 104 for arranging one or more items to be shipped, each of which being a conveyor itself and being associated with the first respectively the second conveyer 14. System 100 also includes a first barcode scanner for identifying orders/items/arrangements 106, a second barcode scanner for identifying orders/items/arrangements 108, a first 3D scanner 110 for identifying the dimensions of an arrangement, a second 3D scanner 112 for identifying the dimensions of an arrangement, a cardboard entry 114 for feeding cardboard into the system 100 and a cut and crease unit 116 for creating box templates.

In this embodiment, the first conveyor and the second conveyor 14 serve as "queueing conveyors" where arrangements can wait for being transported onto merge conveyor 20. The scanners 108, 110 are arranged between the respective arranging station 102, 104 and the respective first queueing conveyor and second queueing conveyor 14. Downstream of the queueing conveyors is the merge conveyor 20 that can receive items from both queueing conveyors. After the merge conveyor 20 there are another two conveyors 28, followed by the align conveyor 80, which is followed by another conveyor 82. Below the conveyors are the cardboard tracks. Below the align conveyor 80 and the conveyor 82 is a cut and crease unit 116 for creating a custom-sized cardboard blank in a manner known in the art.

The system comprises a control unit (not shown) for optimizing the transverse offsets of the merge conveyor 28 and the align conveyor 80 to maximize the overall throughput of the system. If, as shown e.g. in FIG. 14, the system comprises additional conveyors in the supply paths to the merge conveyor 28, the control system may take multiple arrangements from said supply paths into account to optimize the throughput. For example, one optimization could be that the merge conveyor takes into account the position of the fifth conveyor 80 and the available offsets the fifth conveyor 80 can still make in the seventh and eight directions to properly align an arrangement and anticipate on these offsets by making a larger or smaller offset in fourth of fifth direction to prevent that the fifth conveyor 80 must make a repositioning cycle before it can accept an arrangement. Such repositioning cycles may sometimes be helpful when the balance between the dimensions of the arrangements fed on the conveyors 12 and 14 differs too much. The control system can be adapted to calculate, if minimizing these repositioning cycles is useful as they will decrease the throughput of the system, because first the conveyor has to run empty before it can make such a repositioning cycle, and only after this is done the next arrangement may be fed onto this conveyor. This may create a larger gap between two successive arrangements, which has a negative impact on the throughput.

Another example of said optimization could be that in a situation where the number of arrangements supplied through conveyors 12 and 14 differs a lot. In such a situation the control system may be adapted to decide to take multiple arrangements from either conveyor 12 or conveyor 14 successively instead of doing it alternately. In that case a repositioning cycle may often be needed before the next arrangement from the same conveyor 12 or 14 can be fed onto the merge conveyor 20. Instead of doing the minimal repositioning cycle to allow the next arrangement to be fed onto the merge conveyor 20 the maximum repositioning could be done as well, depending on the arrangements present on conveyors 12 and 14 to be processed. By doing such a maximum repositioning it is possible that two successive arrangements from the same conveyor 12 or 14 can be processed successively, reducing the number of repositioning cycles. The merge conveyor 20 may place the arrangements with a minimum offset off center on conveyor 28, where conveyor 28 performs the full alignment to the center position. Doing one maximum repositioning is typically more efficient than doing two smaller repositioning cycles successively, as the conveyor has to run empty only once.

In a preferred embodiment, the length of the merge conveyor is determined such that the combined acceleration from the accelerations in third and fourth or fifth transport direction does not exceed a predefined maximum acceleration even in case the maximum transport offset in fourth or fifth transport direction has to be made. Typically, the normal conveyor length is laid out such that an arrangement can be stopped and started on the conveyor with the maximum allowed acceleration. On the merge conveyor a concurrent acceleration in perpendicular direction is made, which lowers the maximum acceleration in the third transport direction (e.g., if nominally 850 mm/s$^2$) is allowed, then 600 mm/s$^2$ is allowed in both third and fourth or fifth transport direction.

Preferably the transport of an arrangement of one or more items in the fourth or fifth direction is done while the arrangement is being transported in the third direction on the third conveyor. Transportation of an arrangement of one or more items in the fourth or fifth direction can only be done when the arrangement of one or more items is fully on the third conveyor, i.e., it may start when the rear edge of the arrangement is on the third conveyor and it must be finished before the front edge of the arrangement leaves the third conveyor. This means that the available time to transport an arrangement in the fourth or fifth direction also depends on the length of the arrangement. The worst case situation is the case when the longest possible arrangement also has to make the maximum transport offset in the fourth of fifth transport direction. Such a maximum transport offset usually has to be made for the widest possible arrangement, i.e., when the center axis of the arrangement in first or second transport direction has to be aligned with the center axis of the packaging station where the box is created. The transport offset in the fourth and fifth direction is not fully dependent on the width of the arrangement but also depends on the position of the arrangement on the first or second conveyor, i.e., if it is more offset from the center axis of the packaging station a greater transport offset in the fourth of fifth direction has to be made.

Avoiding deceleration and acceleration in the third transport direction on the merge conveyor while the third conveyor is making its movement in the fourth or fifth transport direction would require making the merge conveyor unnecessarily long. This again would have an impact on the throughput if the third conveyor would be dimensioned for the worst case situation. To optimize the throughput of the system, the transport in the third direction can be slowed down if the transport in the fourth or fifth direction cannot be made within the time the arrangement is fully on the merge conveyor. The length of the merge conveyor is therefore determined such that the combined accelerations in third and fourth of fifth direction do not exceed the maximum allowed acceleration for an arrangement of items (the same of course is true for deceleration, which can be regarded as a negative acceleration). Because the third transport direction is orthogonal to the fourth and fifth transport direction, the combined acceleration can easily be calculated by taking the square root of the sum of the squared accelerations in third and fourth or fifth direction. The minimum length for the third conveyor is then the maximum length of an arrangement of one or more items plus the distance it takes to stop the arrangement of one or more items on the third conveyor plus the distance it takes to bring the arrangement of one or more items from standstill back to the nominal transport speed in the third transport direction. A control unit (e.g., programmed computer, microprocessor, microcontroller, motor controller memory) may, once it has calculated the transport offset in fourth or fifth direction, also calculate the amount of delay it has to create in the third transport direction and thus also how much it has to bring down the speed in order to create this delay. The control unit may supply control signals to one or more actuators (e.g., electric motors, solenoids, valves of piston cylinders, etc.) to control direction, speed and/or acceleration of the conveyors.

In a preferred embodiment, the fourth conveyor is positioned symmetrically with respect to the first and second conveyor. However, for certain applications it can be useful if the fourth conveyor is positioned asymmetrically with respect to the first and second conveyor, for example if there is a preferred feed, e.g., an autofeed, which supplies the majority of the arrangements. In this situation, it is possible that for items up to a specific width from the preferred feed the merge conveyor does not need to make a transport in the fourth or fifth direction.

The packaging station may comprise structure known in the art for cutting (which may also include die cutting), like rotating or reciprocating knifes, lasers, die cutters etc. for cutting based for example on information obtained by the aforementioned laser scanners, cardboard blanks from cardboard supplied to the packaging station. The packaging station may further comprise structure known in the art for a creasing, like crease rollers or moving stamps, in order to create crease lines delimiting certain panels on the blank, which in a folded box will form bottom, front, back and side panels, preferably also corner panels and top panels for closing the box. The packaging station may further comprise structure known in the art for folding the cardboard blanks, like moveable grippers and flaps, and preferably also structure for attaching respective panels to each other, like a glue unit for applying hot-melt glue to one or both of overlapping panels, and/or an adhesive strip application unit.

LIST OF REFERENCE NUMBERS 10, system for transporting arrangements
10' system for transporting arrangements
10" system for transporting arrangements
12 first conveyor
12' first conveyor
14 second conveyor
14' second conveyor
16 first transport direction
18 second transport direction
20 third conveyor (also called merge conveyor)
20' third conveyor (also called merge conveyor)
20" third conveyor (also called merge conveyor)
22 third transport direction
23 fourth transport direction
24 fifth transport direction
25 guiding and positioning structure
26 arrangement of one or more items
28 fourth conveyor
28' fourth conveyor
30 outer edge of arrangement 26
32 outer edge of arrangement 26
34 edge of conveyor 20
36 edge of conveyor 20
42 edge of conveyor 12
44 edge of conveyor 12
46 edge of conveyor 14
48 edge of conveyor 14
50 edge of conveyor 28
52 edge of conveyor 28
55 distance
56 virtual straight line extending edge 42
58 width of conveyor 12
60 width of conveyor 14
61 distance
62 virtual straight line 62 extending edge 48
64 arrangement
70 item
72 item
74 item
76 item
80 fifth conveyor (also called align conveyor)
82 sixth conveyor
100 system for automatically packaging items
102 arranging station
104 arranging station
106 barcode scanner
108 barcode scanner
110 3D scanner
112 3D scanner
114 cardboard entry for feeding cardboard into the system
116 cut and crease unit
L length of arrangement 26
W width of arrangement 26
W1 width of arrangement 64
W2 width of arrangement 66

The invention claimed is:

1. A method for transporting items to a packaging station, comprising:
preparing at a first arranging station arrangements of one or more items to be shipped,
preparing at a second arranging station arrangements of one or more items to be shipped,
transporting readily prepared arrangements one at a time either from the first or the second arranging station in a first respectively a second transport direction onto a merge conveyor,
transporting arrangements with the merge conveyor towards a packaging station in a third and optionally one of a fourth and a fifth transport direction,
wherein the arrangement on the merge conveyor is transported in the third and as necessary the fourth or fifth transport direction to arrive at a transfer position for unloading the arrangement from the merge conveyor, in which transfer positon the arrangement is already aligned with respect to a box to be created for the arrangement at the packaging station.

2. The method according to claim 1, wherein said first, second and third transport directions are substantially parallel to each other and said fourth and fifth transport directions are opposite to each other and substantially orthogonal to said first, second and third transport directions.

3. The method according to claim 1, wherein in case arrangements are ready for being transported onto the merge conveyor at both arranging stations, the arrangement requiring the least movement of the merge conveyor in the fourth or the fifth transport direction is selected for being transported onto the merge conveyor.

4. A method for transporting items to a packaging station, comprising:
preparing at a first arranging station arrangements of one or more items to be shipped,
preparing at a second arranging station arrangements of one or more items to be shipped,
transporting readily prepared arrangements one at a time either from the first or the second arranging station in a first respectively a second transport direction onto a merge conveyor,
transporting arrangements with the merge conveyor towards a packaging station in a third and optionally one of a fourth and a fifth transport direction,
wherein the merge conveyor transports an arrangement present on it in the third and as necessary in the fourth or fifth transport direction in dependence of the width seen in the fourth or fifth transport direction of a next arrangement to be transported onto the merge conveyor either to a transfer position for unloading the arrangement present on the merge conveyor, in which the arrangement is already aligned with respect to a box to be created for the arrangement at the packaging station,
or past such transfer position in which it would be in alignment with the box to be created for the arrangement, in case doing so would still allow to unload the arrangement present on the merge conveyor while at the same time facilitating transporting the next arrangement onto the merge conveyor.

5. A system for automatically packaging items in custom-sized cardboard boxes comprising
a first and a second arranging station for arranging one or more items into arrangements to be packaged,
a system for transporting items to a packaging station comprising at least a first conveyor, a second conveyor and a third conveyor for transporting the arrangements to the packaging station, said first conveyor configured to transport arrangements of one or more items in a first transport direction onto the third conveyor, said second conveyor configured to transport arrangements of one or more items in a second transport direction onto the third conveyor, and said third conveyor configured to transport said arrangements from the first and the second conveyor in a third, a fourth and a fifth transport direction towards a packaging station, said packaging station supplied with cardboard, said first arranging station formed by or associated with the first conveyor, said second arranging station formed by or associated with said second conveyor, said packaging station comprising structure to cut and crease custom-sized cardboard blanks and structure to fold a respective blank after an arrangement of one or more items has been transported onto said packaging station structure.

6. A method for automatically packaging items in custom-sized boxes comprising:
preparing at a first arranging station arrangements of one or more items to be shipped,
preparing at a second arranging station arrangements of one or more items to be shipped,
transporting readily prepared arrangements one at a time either from the first or the second arranging station in a first respectively a second transport direction onto a merge conveyor,
transporting arrangements with the merge conveyor towards a packaging station in a third and optionally one of a fourth and a fifth transport direction,
aligning the arrangements with respect to boxes to be created,
cutting and creasing custom-sized cardboard blanks for each arrangement,
transporting each arrangement onto a respective cardboard blank and
folding a respective box from the blank.

7. The method according to claim 6, wherein the arrangement on the merge conveyor is transported in the third and as necessary the fourth or fifth transport direction to arrive at a transfer position for unloading the arrangement from the merge conveyor, in which transfer positon the arrangement is already aligned with respect to a box to be created for the arrangement at the packaging station.

8. The method according to claim 6, wherein the merge conveyor transports an arrangement present on it in the third and as necessary in the fourth or fifth transport direction in dependence of the width seen in the fourth or fifth transport direction of a next arrangement to be transported onto the merge conveyor either to a transfer position for unloading the arrangement present on the merge conveyor, in which the arrangement is already aligned with respect to a box to be created for the arrangement at the packaging station, or past such transfer position in which it would be in alignment with the box to be created for the arrangement, in case doing so would still allow to unload the arrangement present on the merge conveyor while at the same time facilitating transporting the next arrangement onto the merge conveyor.

* * * * *